(12) United States Patent
Ohara et al.

(10) Patent No.: US 6,302,971 B1
(45) Date of Patent: Oct. 16, 2001

(54) PROCESS FOR MAKING MOVEABLE PULLEY HALF

(75) Inventors: Yujiro Ohara, Kanagawa; Fumitaka Nishimura, Yokohama, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/512,087

(22) Filed: Feb. 24, 2000

(30) Foreign Application Priority Data

Feb. 25, 1999 (JP) .................................................. 11-048445
May 26, 1999 (JP) .................................................. 11-146179

(51) Int. Cl.⁷ .................................. C23C 8/20; B21K 1/42
(52) U.S. Cl. .......................... 148/210; 148/211; 148/222; 148/233; 29/892; 474/8
(58) Field of Search .................................. 29/892, 892.1, 29/892.11; 72/82–85; 474/8, 25; 148/210, 211, 226, 233

(56) References Cited

U.S. PATENT DOCUMENTS

| 4,504,246 | * | 3/1985 | Mott | 474/8 |
| 4,617,004 | * | 10/1986 | Mott | 474/8 |
| 4,731,044 | * | 3/1988 | Mott | 474/8 |
| 5,270,374 | * | 12/1993 | Ratliff . | |
| 5,528,952 | * | 6/1996 | Takita et al. | 74/459.5 |
| 6,146,294 | * | 11/2000 | Bolz | 474/8 |

FOREIGN PATENT DOCUMENTS

| 62-28566-A | * | 2/1987 | (JP) | 474/8 |
| 63-115966-A | * | 5/1988 | (JP) | 474/8 |

* cited by examiner

Primary Examiner—P. W. Echols
(74) Attorney, Agent, or Firm—McDermott, Will & Emery

(57) ABSTRACT

A pulley useable with a driving belt in a continuously variable transmission, including a moveable pulley half having an integral cylinder portion integrally formed therewith by plastic working. The moveable pulley half includes an axially extending hollow shaft portion, a radially outwardly extending flange portion having a contact surface frictionally contacted with the driving belt, and the integral cylinder portion axially extending at near an outer peripheral portion of the flange portion. The plastic working includes forming a workpiece, machining the workpiece, spinning the workpiece to form the integral cylinder portion, heat-treating the workpiece and finishing the workpiece to complete the moveable pulley half.

11 Claims, 6 Drawing Sheets

PROCESS FOR MAKING MOVEABLE PULLEY HALF

BACKGROUND OF THE INVENTION

The present invention relates to a pulley useable in a belt-driven continuously variable transmission (CVT), for example, a belt-driven CVT as a power transmission of vehicles, and to a process for making a moveable pulley half of the pulley.

There is a known belt-driven CVT as shown in FIG. 5. The belt-driven CVT includes an input pulley 102 mounted to an input shaft 101 drivingly connected with a power source, an output pulley 103 mounted to an output shaft (not shown), and an endless driving belt 104 connecting the input and output pulleys 102 and 103. The input pulley 102 includes a fixed pulley half 105 integrally formed with the input shaft 101 and a moveable pulley half 106 reciprocally moveable in an axial direction of the input shaft 101. The fixed and moveable pulley halves 105 and 106 include tapered contact surfaces 105a and 106a that are axially opposed to each other and frictionally contacted with the driving belt 104. Similarly, the output pulley 103 includes fixed and moveable pulley halves 107 and 108 having tapered contact surfaces 107a and 108a, respectively. The driving belt 104 displaces in a radial direction of each pulley 102 and 103 as the moveable pulley half 106 and 108 of the pulley 102 and 103 reciprocally moves. The revolution of the input rotating shaft 101 is continuously variably transmitted to the output rotating shaft through the input and output pulleys 102 and 103 and the driving belt 104 depending on continuous radial displacement of the driving belt 104. The moveable pulley half 106 of the input pulley 102 includes a shaft portion 109 mounted to the input shaft 101, a radially outwardly extending flange portion connected with the shaft portion 109, a step portion 111 formed in the flange portion, and an annular cylinder member 110 press-fitted to the step portion 111. The cylinder member 110 fixed to the moveable pulley half 106 is slidably received within a partition wall 115 and cooperates therewith to define a pressure chamber therebetween. Working fluid is fed to the pressure chamber through a communication hole 112 formed in the shaft portion 109. The output pulley 103 has substantially the same structure as that of the input pulley 102.

The moveable pulley half 106 with the cylinder member 110 is formed by the process shown in FIGS. 6A–6F. In FIGS. 6A–6F, only an upper half of a cross-section of the moveable pulley half 106 taken along an axis thereof is shown for the purpose of simple illustration. FIGS. 6E and 6F also show only an upper half of a cross-section of the cylinder member 110.

As illustrated in FIG. 6A, a workpiece 150 having a predetermined shape is formed by forging. Then, as illustrated in FIG. 6B, the workpiece 150 is machined to form the shaft portion 109, the flange portion, the step portion 111 and the communication hole 112. The workpiece 150 machined is heat-treated as indicated by the broken line in FIG. 6C. As illustrated in FIG. 6D, the workpiece 150 heat-treated is then finished to form the moveable pulley half 106 having the contact surface 106a. On the other hand, the cylinder member 110 is formed from sheet metal by a suitable method such as pressing, as shown in FIG. 6E. Finally, as illustrated in FIG. 6F, the cylinder member 110 is press-fitted to the step portion 111 of the moveable pulley half 106. Incidentally, the communication hole 112 is formed before the press-fitting of the cylinder member 110 because the cylinder member 110 is located on a hypothetical extension line extending in a longitudinal direction of the communication hole 112.

SUMMARY OF THE INVENTION

In the above-described conventional arrangement, the moveable pulley half 106 has an increased thickness at the step portion 111 for mounting the cylinder member 110, resulting in an undesirable increased weight of the pulley half as a whole. Additionally, it is required that assembling work of the moveable pulley half 106 and the cylinder member 110 is done with high accuracy, resulting in an increased manufacturing cost.

There is a demand for providing an arrangement useable in the belt-driven continuously variable transmission (CVT), that is capable of solving the problems described above.

It is an object of the present invention to provide a pulley for a belt-driven CVT in which a moveable pulley half of the pulley has a reduced weight and an improved cost performance, and a process for making the moveable pulley half.

According to one aspect of the present invention, there is provided a process for making a moveable pulley half of a pulley useable with an endless driving belt in a continuously variable transmission, said moveable pulley half having an axis and including a hollow shaft portion axially extending, a radially outwardly extending flange portion connected with the shaft portion and formed with a contact surface frictionally contacted with the driving belt, and an integral cylinder portion axially extending at near an outer periphery of the flange portion, said process comprising:

forming a workpiece including a hub wall having a cylindrical bore having a center axis and a flange wall extending perpendicular to the center axis from the hub wall;

machining the workpiece to form the shaft portion from the hub wall, a preformed flange having a truncated conical surface from the flange wall, a thickened peripheral portion axially extending from an outer circumferential portion of the preformed flange, and a communication hole communicating with the cylindrical bore;

spinning the workpiece to form the integral cylinder portion from the thickened peripheral portion;

heat-treating the workpiece; and finishing the workpiece to complete the moveable pulley half including the flange portion having the contact surface.

According to a further aspect of the present invention, there is provided A pulley useable with an endless driving belt in a continuously variable transmission, said pulley having an axis and including an axially moveable pulley half, said moveable pulley half including a hollow shaft portion axially extending, a radially outwardly extending flange portion connected with the shaft portion and formed with a contact surface contacted with the driving belt, and an integral cylinder portion axially extending at near an outer periphery of the flange portion, said moveable pulley half being made by a process comprising:

forming a workpiece including a hub wall having a cylindrical bore having a center axis and a flange wall extending perpendicular to the center axis from the hub wall:

machining the workpiece to form the shaft portion from the hub wall, a preformed flange having a truncated conical surface from the flange wall, a thickened peripheral portion axially extending from an outer circumferential portion of the preformed flange, and a communication hole communicating with the cylindrical bore;

spinning the workpiece to form the integral cylinder portion from the thickened peripheral portion;

heat-treating the workpiece; and finishing the workpiece to complete the moveable pulley half including the flange portion having the contact surface.

DETAILED DESCRIPTION OF THE INVENTION

Figure 1:
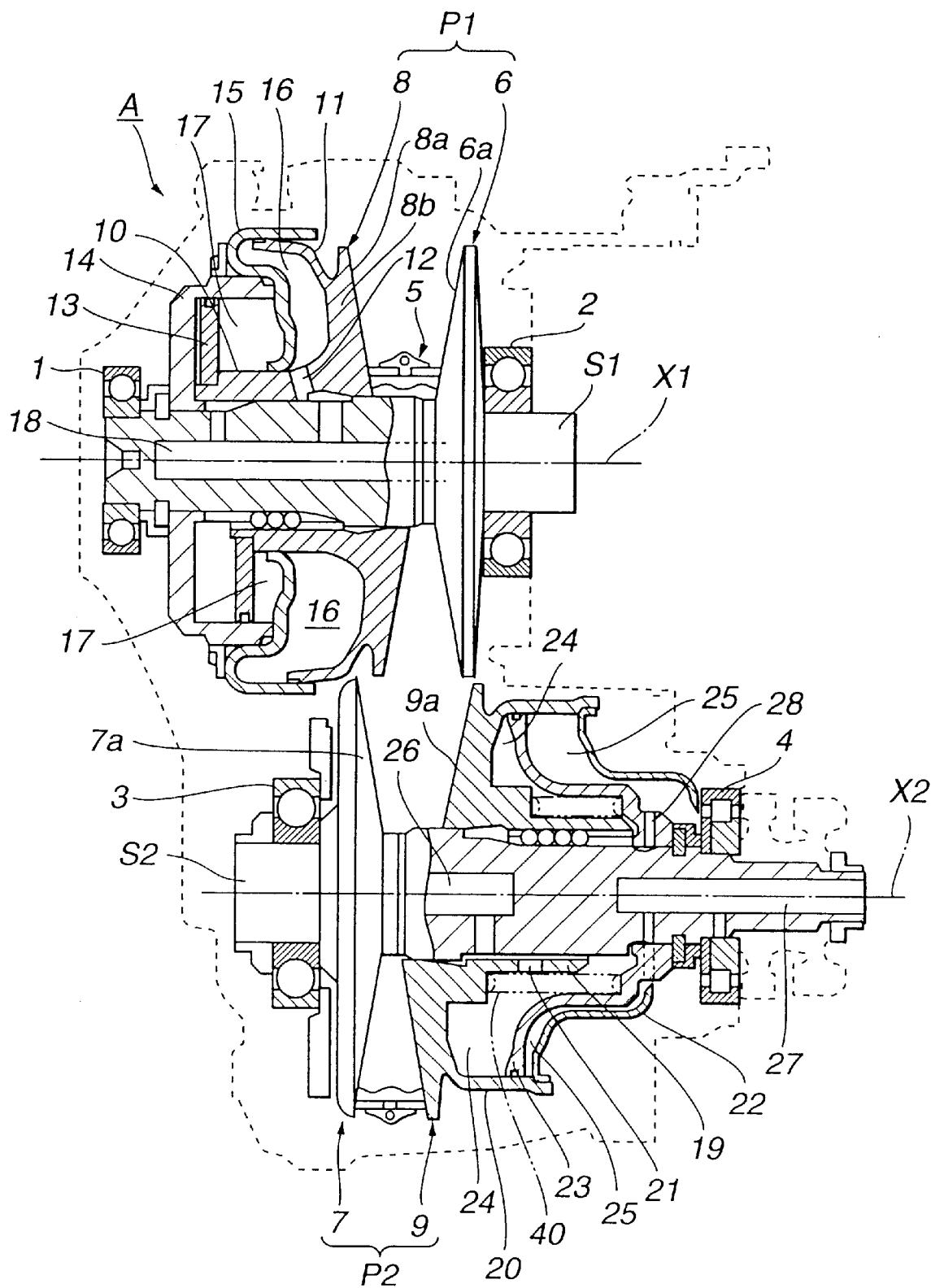
FIG. 1 is a partial section of a belt-driven continuously variable transmission (CVT) including pulleys according to the present invention, taken along axes of the pulleys.

Referring now to FIG. 1, there is shown a belt-driven continuously variable transmission (CVT) using pulleys according to the present invention.

As illustrated in FIG. 1, the belt-driven CVT indicated at A includes an input shaft S1 having a rotation axis X1 and rotatably supported by bearings 1 and 2. The input shaft S1 may be connected to a power source such as an engine. An input pulley P1 is concentrically disposed on the input shaft S1. The CVT also includes an output shaft S2 having a rotation axis X2 and rotatably supported by bearings 3 and 4. An output pulley P2 is concentrically disposed on the output shaft S2. An endless driving belt 5 is disposed between the input and output pulleys P1 and P2 and drivingly connects these pulleys P1 and P2.

The input pulley P1 includes a fixed input pulley half 6 integrally formed with the input shaft S1 and a moveable input pulley half 8 moveably mounted to the input shaft S1. The fixed input pulley half 6 is rotatable about the axis X1 upon a unitary rotation with the input shaft S1. The moveable input pulley half 8 is rotatable about the axis X1 and reciprocally moveable in the axial direction of the input shaft S1. Similarly, the output pulley P2 includes a fixed output pulley half 7 integrally formed with the output shaft S2 and a moveable output pulley half 9 moveably mounted to the output shaft S2. The fixed output pulley half 7 is rotatable about the axis X2 upon a unitary rotation with the output shaft S2. The moveable output pulley half 9 is rotatable about the axis X2 and reciprocally moveable in the axial direction of the output shaft S2. Each pair of the input pulley halves 6 and 8 and the output pulley halves 7 and 9 have axially spaced contact surfaces 6a, 8a and 7a, 9a that are contacted with the driving belt 5. These contact surfaces 6a, 8a, 7a and 9a, respectively, are of a truncated conical shape. Each of the axially spaced contact surfaces 6a and 8a of the input pulley halves 6 and 8 is inclined relative to a hypothetical line perpendicular to the axis X1 such that the axial distance therebetween gradually increases in a radially outward direction of each input pulley halve 6 and 8. The axially spaced contact surfaces 7a and 9a of the output pulley halves 7 and 9 are inclined relative to a hypothetical line perpendicular to the axis X2 in the same manner as the contact surfaces 6a and 8a.

Specifically, the input pulley halves 6 and 8 and the output pulley halves 7 and 9 cooperate to define V-shaped circumferential grooves between the axially spaced contact surfaces 6a, 8a and 7a, 9a thereof, respectively. The driving belt 5 is engaged in the V-shaped circumferential grooves in such a manner that opposed side faces of the driving belt 5 are in contact with the respective contact surfaces 6a, 8a and 7a, 9a. The width of the V-shaped groove, i.e., the axial distance between the contact surfaces 6a, 8a and 7a, 9a, of each of the input and output pulleys P1 and P2 is variable as each moveable pulley half 8 and 9 reciprocally moves. As the axial distances between the contact surfaces 6a, 8a and 7a, 9a vary by the axially reciprocal movement of the moveable pulley halves 8 and 9, a radius of curvature over which the driving belt 5 frictionally contacts with the contact surfaces 6a, 8a and 7a, 9a changes. The driving belt 5 is thus moveable in the radial direction of each of the input and output pulleys P1 and P2 in friction contact with the axially spaced contact surfaces 6a, 8a and 7a, 9a when the axial distances between the contact surfaces 6a, 8a and 7a, 9a vary. This causes change of the speed ratio of the belt-driven CVT A.

The rotation of the input shaft S1 is continuously variably transmitted to the output shaft S2 via the input and output pulleys P1 and P2 and the driving belt 5 depending on the continuous change of the axial distances between the contact surfaces 6a, 8a and 7a, 9a that is caused by the axially reciprocal movement of the moveable pulley halves 8 and 9.

The moveable input pulley half 8 of the input pulley P1 includes an integral cylinder portion 11 of an annular shape that is integrally formed therewith by plastic working as explained later. The moveable input pulley half 8 includes a hollow shaft portion 10 extending in the direction of the axis X1, and a generally disk-like flange portion 8b connected with an axial end of the shaft portion 10, and the integral cylinder portion 11 disposed on an outer periphery of the flange portion 8b. The shaft portion 10 is disposed on the opposite side of the contact surface 8a. The flange portion 8b extends perpendicular to the axis X1, namely, radially outwardly, and has the contact surface 8a on its axial end face. The shaft portion 10 and the flange portion 8b are formed with an axially extending common cylindrical bore configured such that the moveable input pulley half 8 is rotatably and axially moveably mounted onto the input shaft S1. The integral cylinder portion 11 axially extends at near the outer circumferential portion of the flange portion 8b on the opposite side of the contact surface 8a. The integral cylinder portion 11 is formed integrally and concentrically with the shaft portion 10 and the flange portion 8b. A fluid communication hole 12 extends radially and slantly at near the connecting portion of the shaft portion 10 and the flange portion 8b in which the shaft portion 10 and the flange portion 8b are connected together. The fluid communication hole 12 communicates with the cylindrical bore. An annular piston 13 is secured to an opposite axial end of the shaft portion 10.

A cylinder 14 having one closed end is mounted to near the axial end of the input shaft S1 and receives the piston 13. A partition wall 15 is connected with an opposite open end of the cylinder 14 and mounted on the input shaft S1 therethrough. The partition wall 15 receives the integral cylinder portion 11. The partition wall 15 has an inside circumferential surface engaged with an outer circumferential surface of the integral cylinder portion 11. When the moveable input pulley half 8 axially moves, the piston 13 slides on an inside circumferential surface of the cylinder 14 and the integral cylinder portion 11 slides on the inner circumferential surface of the partition wall 15. A first pressure chamber 16 is defined by the moveable input pulley half 8 and the partition wall 15. Specifically, the first pressure chamber 16 is defined between the integral cylinder portion 11, the flange portion, the shaft portion 10 and the partition wall 15. The fluid communication hole 12 is open into the first pressure chamber 16. A second pressure chamber 17 is defined between the shaft portion 10 of the moveable input pulley half 8, the piston 13, the cylinder 14 and the partition wall 15. The first and second pressure chambers 16 and 17 have volumetric capacities variable inversely proportionally depending on the reciprocal movement of the moveable input pulley half 8. The inversely proportional volumetric change of the pressure chambers 16 and 17 is shown in the upper and lower sides of the axis X1 of FIG. 1. A central fluid passage 18 for feeding working fluid is formed in the input shaft S1. The central fluid passage 18 axially extends from one end, i.e., from the right end shown in FIG. 1, of the input shaft S1. The fluid passage 18 is connected with the first pressure chamber 16 via the fluid communication hole 12 and with the second pressure chamber 17 via a fluid passage, not shown. Fluid pressure is built up within each of the first and second pressure chambers 16 and 17 via the corresponding fluid communication. The moveable input pulley half 8 is reciprocally moved by the difference in fluid pressure between the first and second pressure chambers 16 and 17.

The moveable output pulley half 9 of the output pulley P2 has a similar structure as the above-described structure of the moveable input pulley half 8. Namely, the moveable output pulley half 9 includes a hollow shaft portion 19 extending in the direction of the axis X2, a radially extending flange portion connected to the shaft portion 19, and an integral cylinder portion 20 formed integrally and concentrically with the shaft portion 19 and the flange portion. The shaft portion 19, the flange portion and the integral cylinder portion 20 are substantially same as the shaft portion 10, the flange portion 8b and the integral cylinder portion 11 of the moveable input pulley half 8. The moveable output pulley half 9 is formed with a fluid communication hole 21 radially extending at a middle portion of the shaft portion 19, which is provided at the different portion from that of the fluid communication hole 12 of the moveable input pulley half 8. An annular cover 22 is fixed to an axial end portion of the integral cylinder portion 20.

Disposed on the output shaft S2 is a partition wall 23 received in the integral cylinder portion 20 and the cover 22. The integral cylinder portion 20 has an inner circumferential surface engaged with the partition wall 23. The integral cylinder portion 20 is moved in sliding relation to the partition wall 23 upon the reciprocal movement of the moveable output pulley half 9. A third pressure chamber 24 is defined between the shaft portion 19, the flange portion, the integral cylinder portion 20 and the partition wall 23. A fourth pressure chamber 25 is defined between the integral cylinder portion 20, the cover 22 and the partition wall 23. A coiled spring 40 is installed on an outer circumferential surface of the shaft portion 19 and has opposed ends that are seated on the partition wall 23 and a step portion between the shaft portion 19 and the flange portion, respectively. The output shaft S2 is formed with two central fluid passages 26 and 27 extending in the direction of the axis X2 and spaced from each other in the axial direction. The central fluid passage 26 disposed on the left side of the output shaft S2 as shown in FIG. 1, communicates with the third pressure chamber 24 via the fluid communication hole 21. The central fluid passage 27 communicates with the fourth pressure chamber 25 via a fluid communication hole 28 formed in the partition wall 23. Fluid pressure is built in the third and fourth pressure chambers 24 and 25 through the fluid passages 26 and 27. The moveable output pulley half 9 is axially reciprocally moved by the difference in fluid pressure between the third and fourth pressure chambers 24 and 25.

The plastic working for forming the integral cylinder portion of the moveable pulley half may be conducted by any of the following methods:

(1) subjecting a billet to die forging such as backward extrusion;

(2) spinning after forming the workpiece by die forging;

(3) spinning after forming the workpiece by casting; and (4) subjecting a billet to rotational forging and spinning at the same time.

The method (1) may improve the strength of the integral cylinder portion and decrease the thickness thereof, serving for reducing the weight of the moveable pulley half. The method (2) may decrease the machining allowance and then the manufacturing cost in addition to the effects of the method (1). The method (3) can make the workpiece having a shape closer to the shape of the completed moveable pulley half, whereby it may reduce the machining allowance and then the manufacturing cost. Then, the method (4) may omit some working steps, and therefore improve the working efficiency and reduce the machining allowance and then the manufacturing cost.

Referring now to FIGS. 2A–2E, a process for making the moveable input pulley half 8 of the input pulley P1 is explained. The moveable output pulley half 9 may also be produced by the same process. In FIGS. 2A–2E, an upper half of a cross section, taken along the axis, of the moveable input pulley half 8 is shown for the purpose of simple illustration.

Figure 2A:
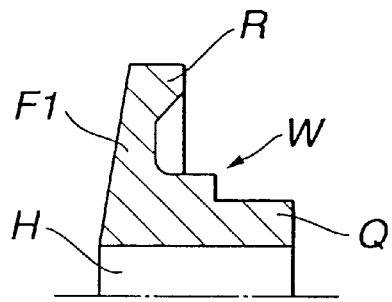
FIGS. 2A–2E show a first embodiment of a process for making a moveable pulley half of one of the pulleys.

As illustrated in FIG. 2A, a workpiece W is formed by forging from a suitable metal material. The workpiece W includes a hub wall Q having a cylindrical bore H having a center axis. The hub wall Q is formed into the shaft portion 10 of the moveable input pulley half 8 in the following machining step. The workpiece W also includes a flange wall F1 radially outwardly extending from the hub wall Q and a peripheral bulge R axially projecting at an outer circumferential portion of the flange wall. The peripheral bulge R has a predetermined thickness required for forming the integral cylinder portion 11 in the following spinning step and for preventing undesired contact with a drilling apparatus in the following drilling step.

Figure 2B:
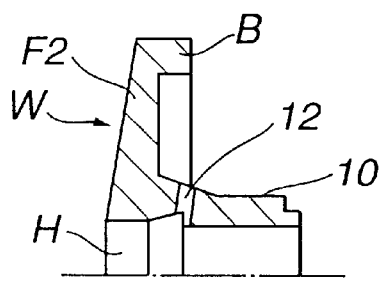

Subsequently, as illustrated in FIG. 2B, the workpiece W is subjected to machining, i.e., rough machining, to form a thickened peripheral portion B, a preformed flange F2 having a truncated conical surface on one side thereof, the shaft portion 10 and the fluid communication hole 12. The peripheral bulge R is cut into the thickened peripheral portion B having a reduced thickness smaller than the predetermined thickness. The integral cylinder portion 11 is not formed in this machining step. The fluid communication hole 12, therefore, can be readily formed in the machining step without being disturbed by the integral cylinder portion 11 that is located on the hypothetical extension line of the fluid communication hole 12. The formation of the fluid communication hole can be easily carried out regardless of the position of the fluid communication hole in the shaft portion. Therefore, various modifications of the fluid communication hole may be made. In the case of forming the moveable output pulley half 9, the fluid communication hole 21 of the moveable output pulley half 9 can also be readily formed.

Figure 2C:
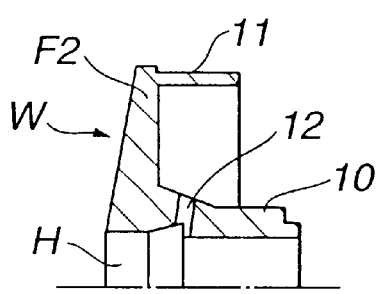

As illustrated in FIG. 2C, the workpiece W machined is then subjected to spinning to form the integral cylinder portion 11 from the thickened peripheral portion B. In the spinning step, the thickened peripheral portion B is formed into the integral cylinder portion 11. The integral cylinder portion 11 has an increased axial length larger than that of the thickened peripheral portion B and a reduced radial width smaller than that of the thickened peripheral portion B. The integral cylinder portion 11 is formed concentrically with the shaft portion 10 with high accuracy. The spinning step is conducted by a spinning apparatus, for example, the apparatus shown in FIG. 3 and explained later.

The workpiece W is then subjected to machining (rough machining) again.

Figure 2D:
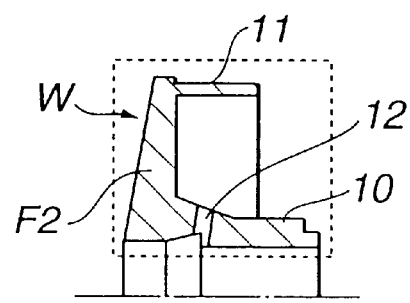

Next, the workpiece W is subjected to heat treatment which is indicated by the broken line in FIG. 2D. In this heat treatment, the workpiece W is carburized and quenched.

Figure 2E:
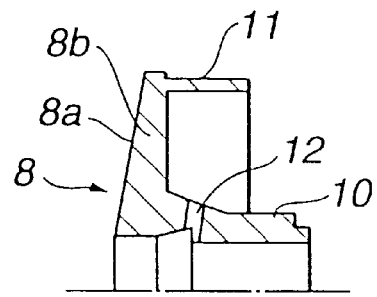

The workpiece W heat-treated is then finished to produce the completed moveable input pulley half 8 including the flange portion 8b having the contact surface 8a as shown in FIG. 2E.

As described above, the workpiece W is subjected to machining again after spinning, and then subjected to carburizing-and-quenching. By carrying out the sequential forming steps, the strain caused by the spinning step can be eliminated and the deviation of stress occurring in the carburizing-and-quenching step can be prevented. This serves for reducing a machining allowance required for the subsequent finishing work and increasing the working accuracy in the finishing work.

Figure 3:
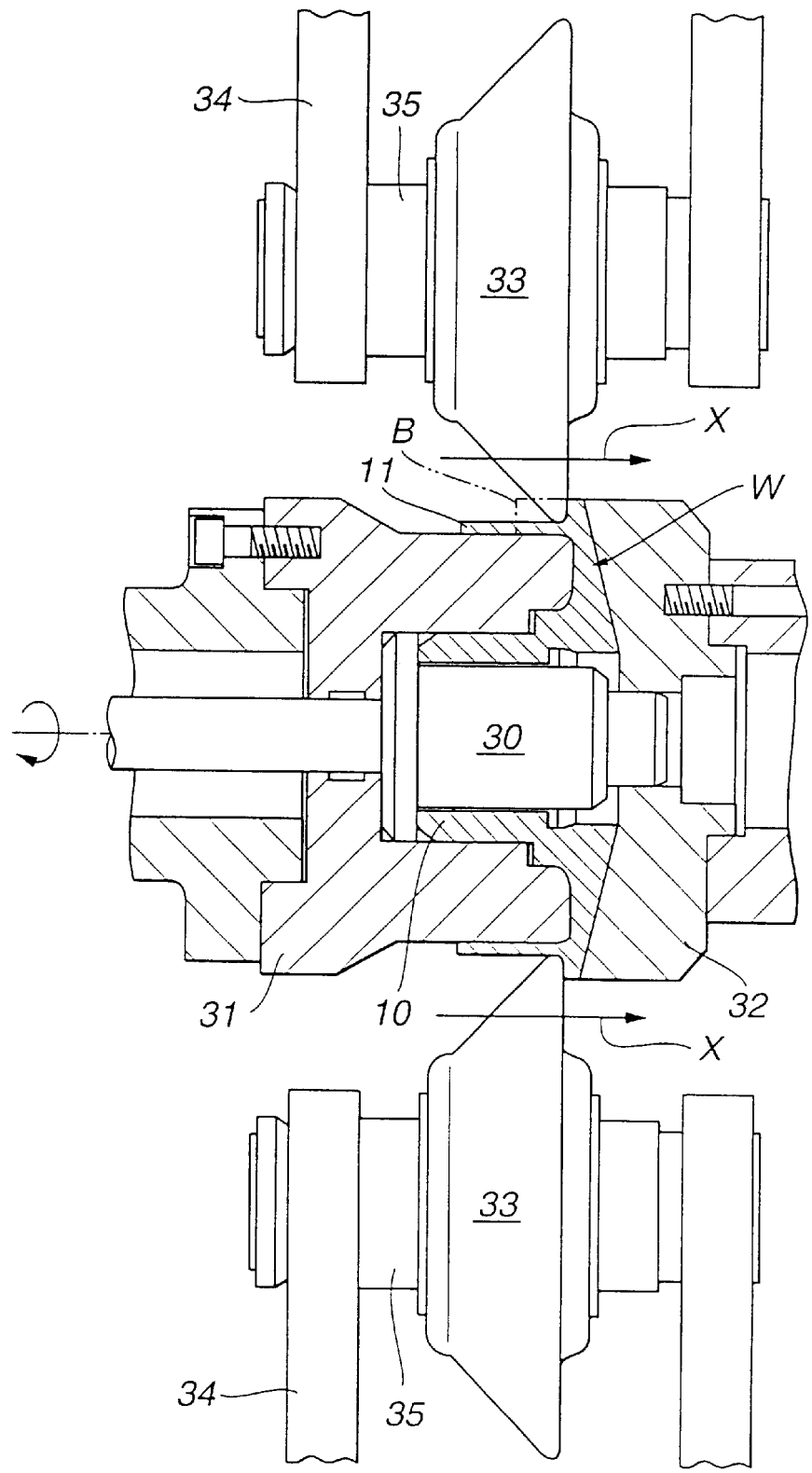
FIG. 3 shows a spinning apparatus useable in the spinning of the process, partly in cross-section.

FIG. 3 shows one example of the apparatus used in the above-described spinning.

As illustrated in FIG. 3, the spinning apparatus includes a supporting shaft 30 inserted into the bore H of the shaft portion 10 of the workpiece W, two mandrels 31 and 32 retaining the workpiece W in the axial direction of the bore H, and a plurality of spinning rollers 33 disposed around the mandrels 31 and 32. The mandrels 31 and 32 are opposed in the axial direction of the bore H, between which the workpiece W is interposed. Each of the rollers 33 is rotatably mounted to a shaft 35 on a moveable roller support 34. In the spinning operation, the workpiece W is rotated about the axis together with the mandrels 31 and 32. The rollers 33 are pressed onto the thickened peripheral portion B, indicated by the phantom line in FIG. 3, of the workpiece W and at the same time the rollers 33 are moved in the axial direction X. The thickened peripheral portion B is thus formed into the thinned integral cylinder portion 11.

Figure 5:
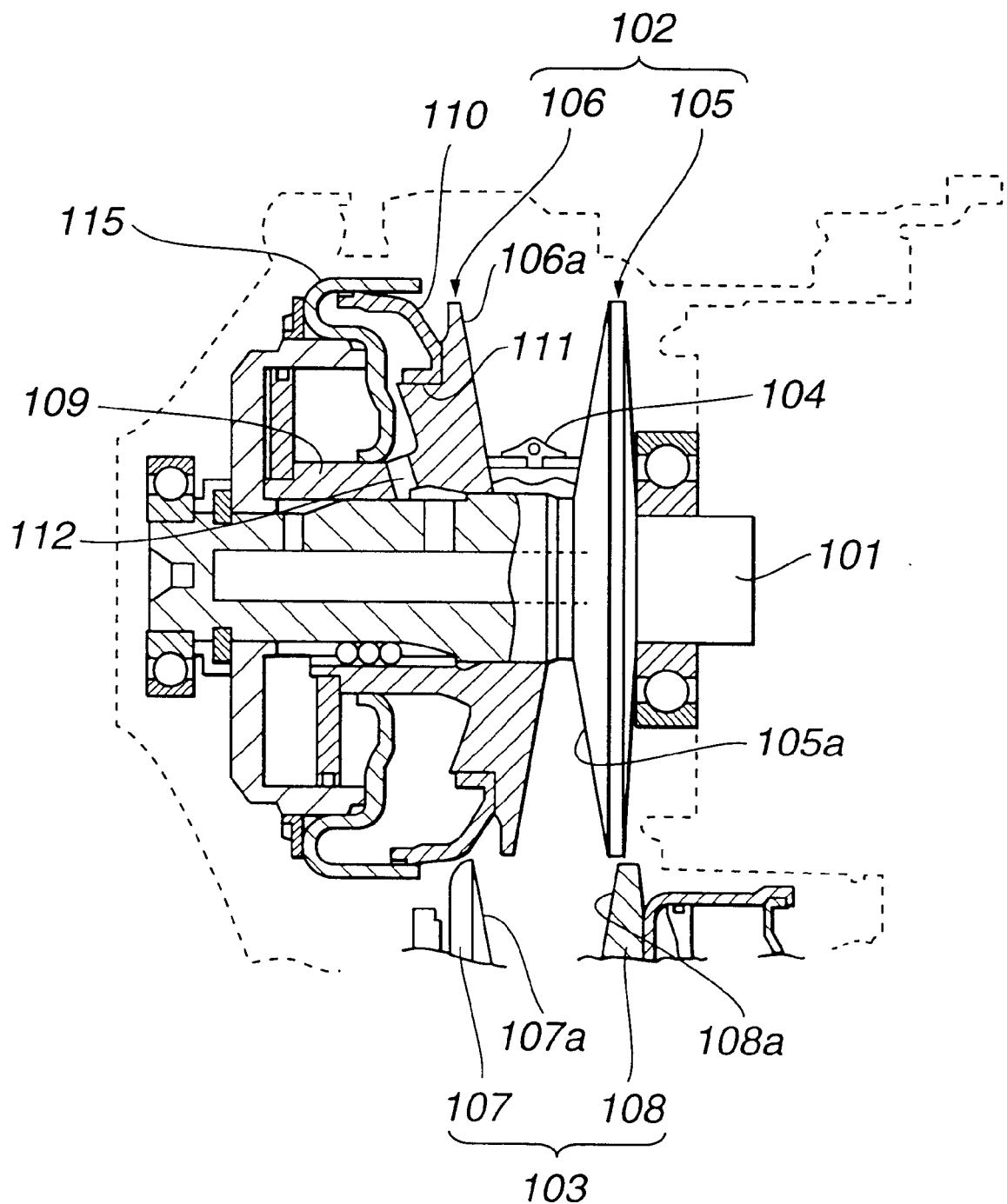
FIG. 5 shows a conventional belt-driven CVT including pulleys.
Figure 6A:
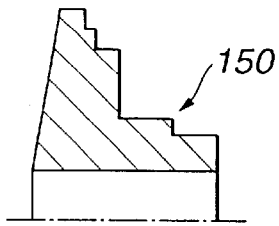
FIGS. 6A–6F show a conventional process of the moveable pulley half of the pulley.
Figure 6B:
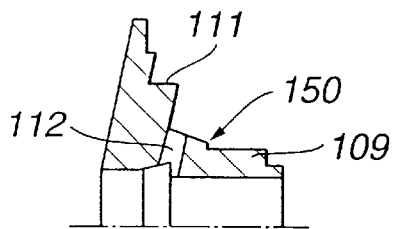
Figure 6C:
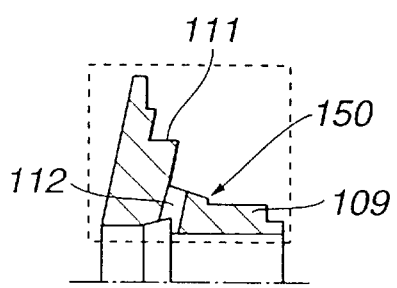
Figure 6D:
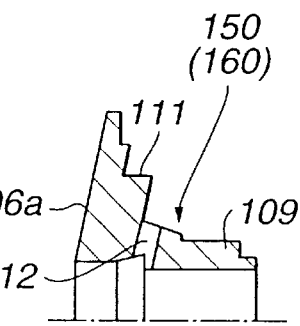
Figure 6E:
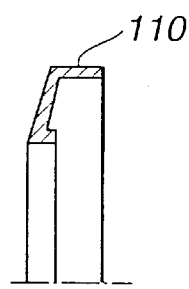
Figure 6F:
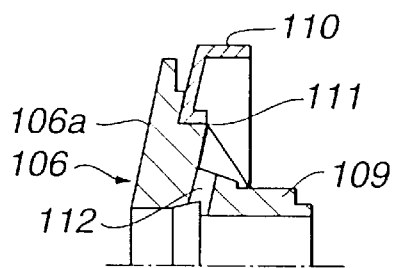

In the structure of the pulley used in the belt-driven CVT and the process for making the moveable pulley half of the pulley as explained above, the integral cylinder portion 11 and 20 is integrally formed with the moveable pulley half 8 and 9 by plastic working. This eliminates the use of the separate cylinder member 110 and the thickened wall structure, i.e., the step portion 111, for mounting the cylinder member 110 as used in the conventional moveable pulley half 106 (see FIGS. 5 and 6). The work of fixing the cylinder member 110 onto the step portion 111 can be no longer required. Additionally, the weight of the moveable pulley half 8 and 9 can be reduced and the integral cylinder portion 11 and 20 can be formed with increased accuracy. The cost performance, therefore, can be improved.

Referring to FIGS. 4A–4E, the second embodiment of the process for making the moveable pulley half, according to the present invention, will be explained hereinafter. Similar to FIGS. 2A–2E, FIGS. 4A–4E show the process for making the moveable input pulley half 8 and merely an upper half of the moveable input pulley half 8 in cross section. Like reference numerals and characters are used for indicating like parts, and therefore detailed explanations therefor are omitted.

Figure 4A:
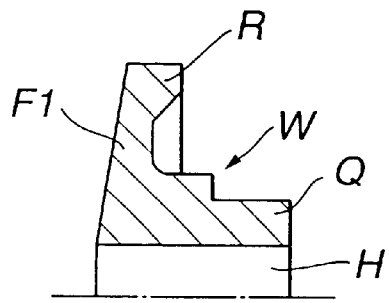
FIGS. 4A–4E show a second embodiment of the process.

As illustrated in FIG. 4A, a workpiece W is formed by forging or casting from a suitable metal material. The workpiece W has substantially the same structure as that shown in FIG. 2A.

Figure 4B:
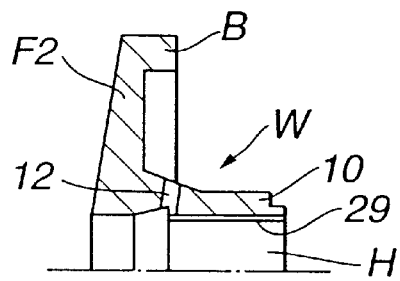

Next, as illustrated in FIG. 4B, the workpiece W is subjected to machining (rough machining) to form a similar structure to that shown in FIG. 2B. In this machining step, a groove 29 communicating with the fluid communication hole 12 is also formed on an inner peripheral surface surrounding the bore H of the shaft portion 10.

Figure 4C:
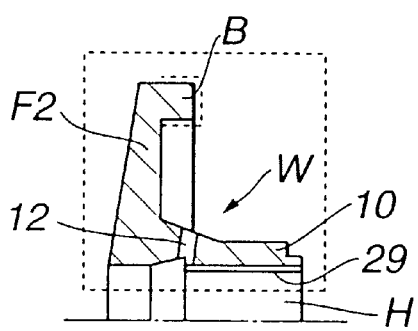

The workpiece W machined is then subjected to carburizing-and-quenching as indicated by the outer broken line extending therearound in FIG. 4C. The thickened peripheral portion B is subjected to anti-carburization as indicated by the inner broken line extending therearound, that is conducted before the carburizing-and-quenching. Upon the actual quenching carried out after the carburization, the workpiece W is placed in a position where the truncated conical surface of the preformed flange F2 on which the contact surface 8a is formed, faces downward, i.e., to a lower side of FIG. 4C. The truncated conical surface of the preformed flange F2 is hardened by the quenching so that the completed moveable pulley half 8 has the hard contact surface 8a. Since the workpiece W is not formed with the thinned cylinder portion 11 in the carburizing-and-quenching step, the workpiece W can be prevented from influence of the thermal deformation that will be caused on the thinned integral cylinder portion 11. When the workpiece W is quenched in the above-described position, a quenching oil trapped by the preformed flange F2 and the thickened peripheral portion B can be reduced because the quenching is conducted before the formation of the integral cylinder portion 11. Further, deformability of the peripheral bulge B that is required in the following spinning can be maintained by the anti-carburization conducted before the carburizing-and-quenching.

Figure 4D:
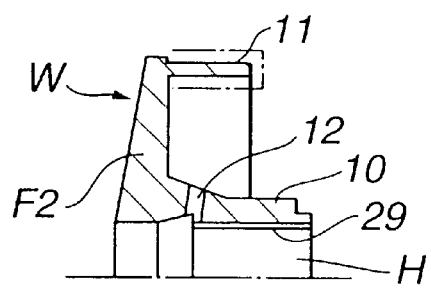

Subsequently, the workpiece W is subjected to spinning and heating with respect to the thickened peripheral portion B, as indicated by the broken line in FIG. 4D. The thickened peripheral portion B is formed into the integral cylinder portion 11. The spinning may be conducted using the apparatus shown in FIG. 3. At least the thickened peripheral portion B is heated within a temperature range of 750–1050° C. during the spinning. The deformability of the thickened peripheral portion B can be enhanced by this heat treatment. Because of the enhanced deformability of the thickened peripheral portion B, the integral cylinder portion 11 can be easily formed with increased accuracy even when the integral cylinder portion 11 is relatively thinned. Problems such as crack of the workpiece W or damage to the spinning apparatus or tools that tend to occur in the spinning may be prevented. Further, by the formation of the integral cylinder portion 11 with increased accuracy, the machining allowance required for the following finishing can be minimized. The hardness of the preformed flange F2 obtained by the above carburizing-and-quenching is kept in the spinning.

Figure 4E:
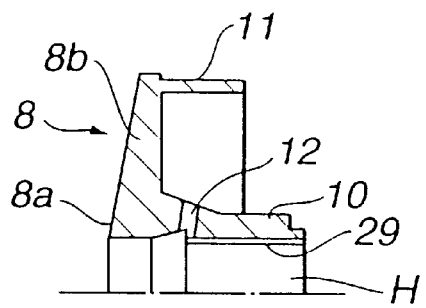

Then, as illustrated in FIG. 4E, the workpiece W worked by spinning is finished to be formed into the completed moveable pulley half 8 having the contact surface 8a on the flange portion 8b.

The process of the second embodiment can exhibit same effects as the above-described effects of the process of the first embodiment. In addition, the process of the second embodiment can produce the moveable pulley halves 8 and 9 including the integral cylinder portions 11 and 20 formed with high accuracy and the contact surfaces 8a and 9a having the sufficient hardness required for friction contact with the driving belt 5.

This application is based on Japanese Patent Applications No. 11-048445, filed on Feb. 25, 1999. and No. 11-146179, filed on May 26, 1999, the entire contents of which, inclusive of the specification, claims and drawings, are hereby incorporated by reference herein.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A process for making a moveable pulley half of a pulley useable with an endless driving belt in a continuously variable transmission, said moveable pulley half having an axis and including a hollow shaft portion axially extending, a radially outwardly extending flange portion connected with the shaft portion and formed with a contact surface for frictional contact with the driving belt, and an integral cylinder portion axially extending at near an outer periphery of the flange portion, said process comprising:

forming a workpiece including a hub wall having a cylindrical bore having a center axis and a flange wall extending perpendicular to the center axis from the hub wall;

machining the workpiece to form the shaft portion from the hub wall, a preformed flange having a truncated conical surface from the flange wall, a thickened peripheral portion axially extending from an outer circumferential portion of the preformed flange, and a communication hole communicating with the cylindrical bore;

spinning the workpiece to form the integral cylinder portion from the thickened peripheral portion;

heat-treating the workpiece; and finishing the workpiece to complete the moveable pulley half including the flange portion having the contact surface.

2. A process as claimed in claim 1, wherein further machining is conducted between the spinning and the heat-treating.

3. A process as claimed in claim 1, wherein the heat-treating includes carburizing-and-quenching.

4. A process as claimed in claim 3, wherein the heat-treating is conducted between the spinning and the finishing.

5. A process as claimed in claim 3, wherein the heat-treating is conducted between the machining and the spinning.

6. A process as claimed in claim 5, further comprising anti-carburizing the thickened peripheral portion, said anti-carburizing being conducted before the carburizing-and-quenching.

7. A process as claimed in claim 6, further comprising heating at least the thickened peripheral portion, said heating being conducted in the spinning.

8. A process as claimed in claim 7, wherein the heating is conducted within a temperature range of 750–1050° C.

9. A process as claimed in claim 1, wherein the integral cylinder portion is arranged to be in an opposite side of the truncated conical surface.

10. A process as claimed in claim 1, wherein the workpiece includes a peripheral bulge axially projecting from an outer circumferential portion of the flange wall, said thickened peripheral portion being formed from the peripheral bulge.

11. A process as claimed in claim 10, wherein the peripheral bulge has a thickness smaller than the thickened peripheral portion.

* * * * *